Figure 1:
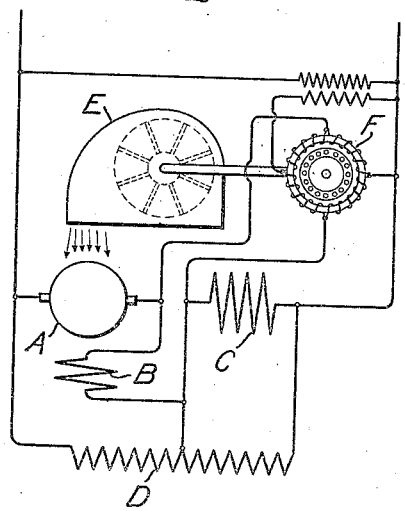

E. F. W. ALEXANDERSON.
SINGLE PHASE COMMUTATOR MOTOR.
APPLICATION FILED JAN. 4, 1908.

953,366.

Patented Mar. 29, 1910.

Witnesses:
George W. Tilden
J. Ellis Glen

Inventor:
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE COMMUTATOR-MOTOR.

953,366.  Specification of Letters Patent.   Patented Mar. 29, 1910.

Application filed January 4, 1908. Serial No. 409,272.

*To all whom it may concern:*

Be it known that I, ERNST F. W. ALEXANDERSON, a citizen of the United States, residing at Schenectady, county of Schenectady, State of New York, have invented certain new and useful Improvements in Single-Phase Commutator-Motors, of which the following is a specification.

My invention relates to single-phase commutator motors which have their windings connected so as to produce in the motor a series characteristic, and among its objects are to improve the speed-torque characteristic of the motor, to improve the commutation of the motor, to derive from the motor polyphase voltage for supplying a polyphase induction motor for driving a ventilating fan for the main motor, and to employ the induction motor as a phase-converter for obtaining the desired speed characteristic.

My invention thus comprises a number of objects and a number of features which may advantageously be used in combination, but certain of which may be used alone, if desired.

The speed-torque characteristic of an alternating-current motor having a series characteristic, such as the compensated series motor, or the repulsion motor, or a combination of the two, differs from that of a direct-current motor, in that the torque falls off less rapidly with increase of speed. The result is that if in an alternating-current locomotive the motors are designed with a high enough torque to drive the maximum load on the locomotive, the locomotive will tend to run away on light loads. This tendency can be eliminated by superposing on the series characteristic of the motor a shunt characteristic which limits the speed, and one feature of my invention comprises a novel arrangement for providing this shunt characteristic. In operation, the voltage-drop across the exciting winding of the motor is displaced in phase substantially ninety degrees from the voltage-drop across the inducing or compensating winding; which latter voltage is practically in phase with the line-voltage. I, accordingly, employ a phase converter having one phase connected to a source of voltage substantially in phase with the line-voltage, or with the voltage across the inducing or compensating winding, and another phase connected to the exciting winding. Such an arrangement impresses a shunt excitation of proper phase on the exciting winding, which gives the motor, to a certain extent, a shunt characteristic superposed on its normal series characteristic. If the phase converter had no leakage whatever, so that the voltage across the terminals of the exciting winding were rigidly fixed, the motor would, of course, become a pure shunt motor; but because of the leakage which necessarily exists in a phase converter of ordinary design, the voltage impressed by it on the exciting winding of the motor is not absolutely fixed, so that the effect is merely to superpose a shunt characteristic on the series characteristic of the motor.

I have said that the voltage impressed on one phase of the converter is in phase with the line-voltage, or with that across the terminals of the inducing winding. One feature of my invention consists in deriving this voltage from a winding on the stator of the main motor in inductive relation to the inducing winding. The voltage induced in this auxiliary winding is in phase with the voltage across the terminals of the inducing winding, but if the fluxes of the inducing and auxiliary windings are not perfectly interlinked, the current in the auxiliary winding will produce leakage fields, which, if the auxiliary winding is properly placed, may be employed as commutating fields. If the auxiliary winding is connected to the exciting winding through a phase converter, as above described, the leakage fields produced by the auxiliary winding are of the proper phase for neutralizing the electromotive forces induced by the transformer action of the exciting winding in the armature coils short-circuited by the brushes in commutation. If the connection from the auxiliary winding to the exciting winding is made directly, instead of through a phase converter, the commutating field produced by the auxiliary winding is of the proper phase for neutralizing the electromotive force of commutation reactance in the short-circuited coils. Thus, the use of the auxiliary winding is advantageous, even if not in combination with the phase converter.

It is often desirable to employ a ventilating fan for the large motors used in alternating-current locomotives, and for driving such a fan a polyphase induction motor is best suited. If the polyphase induction motor is connected as the phase converter for the main single-phase motor, it not only performs the function of a polyphase converter, but at the same time derives from the main motor the polyphase voltage necessary for its own operation. My invention, accordingly, involves as one of its features the combination of a main motor, a ventilating fan, and an induction motor for driving the fan, with the induction motor connected to the windings of the main motor as a phase converter.

My invention further comprises other features which will best be understood by reference to the accompanying drawings, in which—

Figure 2:
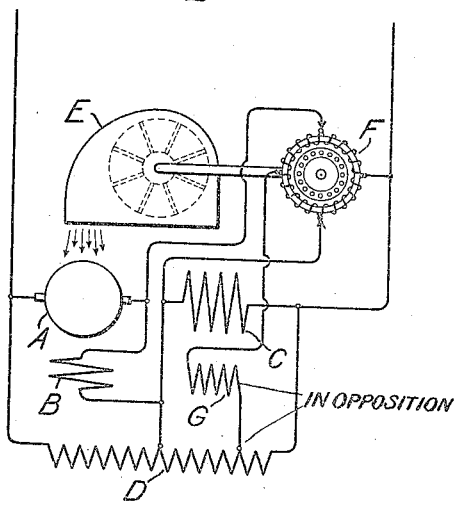

Figure 1 shows diagrammatically a single-phase commutator motor arranged in accordance with my invention; Fig. 2 shows a modification of the same; and Fig. 3 shows a diagrammatic end-elevation, partly in cross-section, of the motor structure.

In Fig. 1, A represents the armature, B the exciting winding, and C the inducing or compensating winding of a single-phase commutator motor. This latter winding, which produces a magnetomotive force in line with that of the armature, is ordinarily termed an "inducing winding" in repulsion motors, and a "compensating winding" in compensated series motors. In order to avoid using both terms, I shall hereinafter term this winding simply an "inducing winding," it being understood that I do not thereby limit my invention to a motor connected as a repulsion motor. The three motor windings are connected in series across the supply transformer D, while a shunt voltage from this transformer is impressed across the armature A and exciting winding B in series. This connection, and its advantages, have been described at length in my prior patent No. 923,754, issued June 1, 1909. E represents a ventilating fan, or blower, for cooling the motor. This fan is driven by a small polyphase induction motor F, on one phase of which is impressed a voltage in phase with the line-voltage, while another phase, which is shown as displaced ninety degrees from the first phase is connected across the exciting winding B. The motor F thus acts as a phase converter to impress on the exciting winding a shunt voltage displaced ninety degrees from the line-voltage, and thereby to superpose on the series characteristic of the commutator motor a shunt characteristic which tends to limit its speed on light loads. At the same time through its connections to the main motor, the induction motor F derives the polyphase voltages necessary for starting it, since the voltage-drop across the exciting winding B, in operation, is approximately ninety degrees out of phase with the line voltage. As has been said above, if there were no leakage in the induction motor F, the connection shown would make the main motor a pure shunt motor, but because of the leakage which necessarily exists, the effect of the connections shown is merely to impress a shunt characteristic on the normal series characteristic of the motor.

Fig. 2 shows a modification of the connections, in which the voltage for one phase of the phase converter is derived from an auxiliary winding G on the stator. This winding G is placed in inductive relation to the inducing winding C, and the voltage induced in it is consequently in phase with the voltage at the terminals of the inducing winding, which, in turn, is in phase with the line-wire. The voltage supplied to the phase converter from the winding G is consequently the same as though the phase converter were connected to the line, as in Fig. 1, but the arrangement of Fig. 2 possesses the advantage that if the winding G is not perfectly interlinked with the winding C, leakage fields will be produced, which may be employed as commutating fields in the main motor. In Fig. 2, the connections from the exciting winding B to the phase converter are indicated as arranged to be shifted so that the phase relation between the voltages at the terminals of the windings G and B may be varied. With the two-phase relation shown in Fig. 2, the leakage fields produced by the winding G are of the proper phase for inducing in the armature coils short-circuited by the brushes in commutation an electromotive force opposing the electromotive force induced in those coils by the transformer action of the exciting winding B. If the points of connection from the exciting winding to the phase converter were shifted ninety degrees, so as to make them coincide with the connections from the winding G, the leakage fields produced by the winding G would be of the proper phase to induce in the short-circuited armature coils an electromotive force opposing that of commutation reactance. In the latter case the winding G and winding B would be connected directly together, and this connection may be used with advantage when no phase converter is present. At any intermediate position of the connection from winding B to the motor F the leakage fields produced by the winding G will have components tending to oppose both the electromotive force induced by transformer action and the electromotive force of commutation reactance. It will be noted that a small portion of the transformer D is included in the connection from winding G to the phase converter or motor F. The purpose of this is to regulate the rate of variation of the commutating field with change in the strength of the exciting field. If the motor is operated from a constant-line potential, the relation between the strengths of the exciting and commutating fields is constant, and it is therefore only necessary to fix the relation between the strength of the exciting field and the commutating field to get good commutation at any speed, for, when the speed is low, the voltage on the exciting field is high, and the commutating field should also be high. It is, however, desirable that the commutating field should change at a higher rate than the strength of the exciting winding. This is obtained by the connection of Fig. 2, in which a small voltage derived from the transformer D is placed in series with and in opposition to the voltage of the winding G. The differential of these two voltages is consequently impressed on the phase converter, and a given variation in the voltage of the auxiliary winding G produces a greater relative variation in the voltage impressed on the phase converter F.

Figure 3:
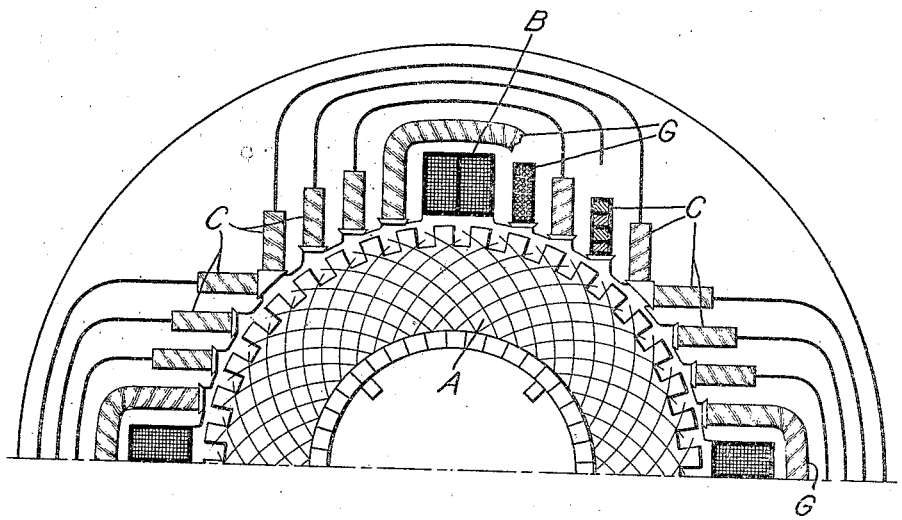

Fig. 3 shows diagrammatically the preferred construction of the motor. The coils of the exciting winding B are placed in large slots between the poles of the stator, while the inducing winding C is distributed in smaller slots over the pole faces. The auxiliary windings G, the coils of which have a large number of turns, as compared with the coils of the inducing winding, are placed in the slots next to the pole-tips, so that the leakage fields, due to the current in the coils G and the imperfect interlinkage of these coils with the coils C, are at the tips of the poles. The coils of the armature winding are arranged with a pitch approximately equal to the circumferential width of the pole-faces, so that the coils undergoing commutation are beneath the pole-tips, and are exposed to the leakage fields of the coils G.

It will be seen that my invention comprises a number of features, which, while they are particularly advantageous in combination, may, some of them, be used with advantage separately.

I do not desire to limit myself to the particular construction and arrangement of parts here shown, but aim in the appended claims to cover all modifications which are within the scope of my invention.

What I claim as new and desire to secure by Letters Patent of the United States, is,—

1. A single-phase motor of the commutator type having an armature winding provided with a commutator and having inducing and exciting windings on the stator with the exciting winding connected directly in series with one of the other motor windings, to produce a series characteristic in the motor, and a phase converter having a voltage impressed on one of its phases in phase with the voltage on the motor terminals and having another of its phases connected to the terminals of the exciting windings, whereby a shunt characteristic is superposed on the series characteristic of the motor.

2. A single-phase motor of the commutator type having an armature winding provided with a commutator and having inducing and exciting windings on the stator with the exciting winding connected directly in series with one of the other motor windings to produce a series characteristic in the motor, and a phase converter having impressed on one of its phases a voltage in phase with the voltage on the terminals of the inducing winding and another of its phases connected to the terminals of the exciting winding.

3. A single-phase motor of the commutator type having inducing and exciting windings on the stator connected to produce a series characteristic in the motor, a winding on the motor stator in inductive relation to the inducing winding, and a phase converter having one of its phases connected to the last mentioned winding and another of its phases connected to the exciting winding.

4. A single-phase motor of the commutator type having inducing and exciting windings on the stator connected to produce a series characteristic in the motor, a winding on the motor stator in inductive relation to the inducing winding, a phase converter having one of its phases connected to the last mentioned winding and another of its phases connected to the exciting winding, and a source of voltage in phase with the voltage at the terminals of the inducing winding connected in circuit with, and opposing the voltage of, the winding that is in inductive relation to the inducing winding.

5. A single-phase motor of the commutator type having inducing and exciting windings on the stator connected to produce a series characteristic in the motor, a winding on the motor stator in inductive relation to the inducing winding producing a magnetomotive force at the point occupied by the armature coils when undergoing commutation, connections between the last mentioned winding and the exciting winding, and a phase converter included in said connections.

6. A single-phase motor of the commutator type, having a stator having projecting poles, an exciting winding having its coils carried between the stator poles, an inducing winding distributed in slots on the pole-faces, a winding having its coils carried in slots near the pole-tips in inductive relation to the inducing winding, connections including a phase converter between the last mentioned winding and the exciting winding whereby a voltage is impressed on the terminals of the exciting winding due to the voltage induced in the said last-mentioned winding and an armature winding having a coil-pitch approximately equal to the circumferential width of the pole-faces.

7. A single-phase motor of the commutator type, having a stator having projecting poles, an exciting winding having its coils carried between the stator poles, an inducing winding distributed in slots on the pole-faces, a winding having its coils carried in slots near the pole-tips in inductive relation to the inducing winding, connections between the last mentioned winding and the exciting winding and an armature winding having a coil-pitch approximately equal to the circumferential width of the pole-faces, and a phase converter included in said connections.

8. In combination, a single-phase motor of the commutator type, a fan for ventilating said motor, a polyphase induction motor for driving said fan, and connections between the different phases of said induction motor and the windings of said single-phase motor whereby said induction motor serves as a phase converter interconnecting the windings of the single-phase motor.

9. In combination, a single-phase motor of the commutator type, a fan for ventilating said motor, and a polyphase induction motor for driving said fan, said induction motor having impressed on one of its phases a voltage in phase with the line voltage and having another of its phases connected to the exciting winding of the single-phase motor.

In witness whereof, I have hereunto set my hand this 2nd day of January, 1908.

ERNST F. W. ALEXANDERSON.

Witnesses:
BENJAMIN B. HULL,
HELEN ORFORD.